United States Patent
Huang et al.

(10) Patent No.: US 9,801,181 B2
(45) Date of Patent: Oct. 24, 2017

(54) FREQUENCY BAND RESOURCE SCHEDULING METHOD AND APPARATUS

(71) Applicant: Huawei Technologies Co., Ltd., Shenzhen (CN)

(72) Inventors: Jianzhong Huang, Shenzhen (CN); Youcheng Zhang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 110 days.

(21) Appl. No.: 14/852,261

(22) Filed: Sep. 11, 2015

(65) Prior Publication Data

US 2015/0382355 A1 Dec. 31, 2015

Related U.S. Application Data

(63) Continuation of application No. PCT/CN2013/072489, filed on Mar. 12, 2013.

(51) Int. Cl.
| | |
|---|---|
| *H04W 72/04* | (2009.01) |
| *H04W 72/12* | (2009.01) |
| *H04L 5/00* | (2006.01) |
| *H04W 72/08* | (2009.01) |

(52) U.S. Cl.
CPC ........... *H04W 72/0453* (2013.01); *H04L 5/00* (2013.01); *H04W 72/1231* (2013.01); *H04W 72/085* (2013.01)

(58) Field of Classification Search
CPC ...................... H04W 72/0453; H04W 72/1432
See application file for complete search history.

(56) References Cited

U.S. PATENT DOCUMENTS

2007/0230397 A1* 10/2007 Sakata ................ H04W 72/085
370/329
2007/0232341 A1* 10/2007 Sakata .................. H04L 1/0026
455/509

(Continued)

FOREIGN PATENT DOCUMENTS

| CN | 101730239 A | 6/2010 |
|---|---|---|
| CN | 101790243 A | 7/2010 |

(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 11)," 3GPP TS 36.211 V11.1.0, Dec. 2012, 108 pages.

(Continued)

*Primary Examiner* — Albert T Chou
(74) *Attorney, Agent, or Firm* — Slater Matsil, LLP

(57) ABSTRACT

The present invention discloses a frequency band resource scheduling method and apparatus, where the method includes: first, selecting, according to transmission quality of each to-be-selected sub-band, a sub-band to be allocated to a user terminal; and then, determining whether a transmission quality decreasing amplitude of the user terminal exceeds a first preset value after the selected sub-band is allocated to the user terminal; and if yes, skipping allocating the selected sub-band to the user terminal; otherwise, allocating the selected sub-band to the user terminal.

10 Claims, 4 Drawing Sheets

(56) References Cited

U.S. PATENT DOCUMENTS

| | | | |
|---|---|---|---|
| 2008/0214198 A1* | 9/2008 | Chen | H04L 1/0026 455/450 |
| 2010/0041344 A1 | 2/2010 | Kim et al. | |
| 2011/0319113 A1 | 12/2011 | Takeda et al. | |
| 2012/0026986 A1 | 2/2012 | Dass | |
| 2014/0227987 A1* | 8/2014 | Seo | H04L 5/0057 455/115.1 |
| 2015/0078284 A1* | 3/2015 | Lee | H04L 1/0026 370/329 |

FOREIGN PATENT DOCUMENTS

| | | |
|---|---|---|
| CN | 102244881 A | 11/2011 |
| CN | 102356685 A | 2/2012 |
| CN | 102801498 A | 11/2012 |
| EP | 2134134 A1 | 12/2009 |
| GB | 2491222 A | 2/2012 |

OTHER PUBLICATIONS

"3rd Generation Partnership Project; Technical Specification Group Radio Access Network; Evolved Universal Terrestrial Radio Access (E-UTRA); Physical Layer Procedures (Release 11)," 3GPP TS 36.213 V11.1.0, Dec. 2012, 160 pages.

Gonzalez, D.G. et al., "Improving the Interplay between Periodic Channel State Information Feedback and Static Intercell Interference Coordination in LTE," Journal of Communications, vol. 7, No. 9, Sep. 2012, 16 pages.

\* cited by examiner

| CQI index | Modulation | Code rate x 1024 | Efficiency | SINR (dB) |
|---|---|---|---|---|
| 0 | Out of range | | | <=−5.98 |
| 1 | QPSK | 78 | 0.1523 | −5<SINR<=−4 |
| 2 | QPSK | 120 | 0.2344 | −4<SINR<=−3 |
| 3 | QPSK | 193 | 0.377 | −3<SINR<=−1 |
| 4 | QPSK | 308 | 0.6016 | −1.1<SINR<=1 |
| 5 | QPSK | 449 | 0.877 | 1<SINR<=3 |
| 6 | QPSK | 602 | 1.1758 | 3<SINR<=5 |
| 7 | 16QAM | 378 | 1.4766 | 5<SINR<=7 |
| 8 | 16QAM | 490 | 1.9141 | 7<SINR<=9 |
| 9 | 16QAM | 616 | 2.4063 | 9<SINR<=11 |
| 10 | 64QAM | 466 | 2.7305 | 11<SINR<=12 |
| 11 | 64QAM | 567 | 3.3223 | 12<SINR<=15 |
| 12 | 64QAM | 666 | 3.9023 | 15<SINR<=17 |
| 13 | 64QAM | 772 | 4.5234 | 17<SINR<=19 |
| 14 | 64QAM | 873 | 5.1152 | 19<SINR<=23 |
| 15 | 64QAM | 948 | 5.5547 | >23 |

FREQUENCY BAND RESOURCE SCHEDULING METHOD AND APPARATUS

This application is a continuation of International Application No. PCT/CN2013/072489, filed on Mar. 12, 2013, which is hereby incorporated by reference in its entirety.

TECHNICAL FIELD

The present invention relates to the field of wireless communications technologies, and in particular, to a frequency band resource scheduling method and apparatus.

BACKGROUND

As a wireless broadband technology develops, a bandwidth occupied by a wireless network system is larger. For example, a bandwidth occupied by a CDMA (Code Division Multiple Access) system is 1.23 MHz, a bandwidth occupied by a UMTS (Universal Mobile Telecommunications System) is 5 MHz, and a bandwidth occupied by an LTE (Long Term Evolution) system is more flexible. Bandwidth resources owned by the LTE system include bandwidths of 1.4 MHz, 3 MHz, 5 MHz, 10 MHz, 15 MHz, and 20 MHz.

Based on a wireless network with a larger bandwidth, to improve user experience, operators tend to use a large bandwidth when spectrum resources are allowable. However, in a case in which a large bandwidth is used, if corresponding narrowband interference exists in a part of frequency domain in use, a transmission rate of a system consequently decreases. For example, when an individual user occupies a full bandwidth, a transmission rate of the full bandwidth consequently decreases, which causes relatively great impact on transmission performance of the system.

A currently used interference reduction manner includes: in a frequency selection process, a sub-band with optimal or relatively good channel quality is selected for scheduling. In a case in which not all bandwidths are occupied, a severely-interfered sub-band (namely, narrowband interference) may be avoided in the manner of selecting a sub-band with relatively good channel quality, thereby implementing interference reduction. However, in a case of FullBuffer, all sub-bands are used for scheduling; in this case, narrowband interference cannot be reduced even in the foregoing manner.

SUMMARY

A purpose of the present invention is to provide a frequency band resource scheduling method and apparatus, so as to reduce interference in a wireless communications system.

According to a first aspect, the frequency band resource scheduling method is provided. A sub-band to be allocated to a user terminal is selected according to transmission quality of each to-be-selected sub-band from at least one to-be-selected sub-band. It is determined whether a transmission quality decreasing amplitude of the user terminal exceeds a preset value after the selected sub-band is allocated to the user terminal. If so, allocating the selected sub-band to the user terminal is skipped; otherwise, the selected sub-band is allocated to the user terminal.

Based on the first aspect, in a first possible implementation manner of the first aspect, the step of selecting a sub-band to be allocated to a user includes acquiring a channel quality indicator CQI that is of the at least one to-be-selected sub-band and that is reported by the user terminal, and selecting, from the at least one to-be-selected sub-band according to the CQI, a sub-band with optimal channel quality as the sub-band to be allocated to the user terminal.

Based on the first aspect, in a second possible implementation manner of the first aspect, the determining whether a transmission quality decreasing amplitude of the user terminal exceeds the preset value after the selected sub-band is allocated to the user terminal includes acquiring a size of a new transport block schedulable for the user terminal after the selected sub-band is allocated to the user terminal and, if a difference between the size of the new transport block schedulable for the user terminal and a size of an original transport block exceeds a first preset value, or the size of the new transport block schedulable for the user terminal is less than a second preset value, determining that the transmission quality decreasing amplitude of the user terminal exceeds the preset value; otherwise, determining that the transmission quality decreasing amplitude of the user terminal does not exceed the preset value.

Based on the second possible implementation manner of the first aspect, in a third possible implementation manner of the first aspect, the acquiring a size of a new transport block schedulable for the user terminal after the selected sub-band is allocated to the user terminal includes calculating an average of CQIs of all sub-bands of the user terminal after the selected sub-band is allocated to the user terminal; and determining a modulation and coding scheme MCS in a system according to the average of the CQIs of all the sub-bands of the user terminal; and determining, based on the MCS and a quantity of sub-bands or radio bearers allocated to the user terminal, the size of the new transport block schedulable for the user terminal.

Based on the third possible implementation manner of the first aspect, in a fourth possible implementation manner of the first aspect, the calculating an average of CQIs of all sub-bands of the user terminal after the selected sub-band is allocated to the user terminal includes average of CQIs of all sub-bands of the user terminal=$(CQI_1+CQI_2+ \ldots +CQI_n)$/quantity of sub-bands, where $CQI_1$ is a CQI value corresponding to the first sub-band allocated to the user terminal, $CQI_2$ is a CQI value corresponding to the second sub-band allocated to the user terminal, $CQI_n$ is a CQI value corresponding to the $n^{th}$ sub-band allocated to the user terminal, and n is a quantity of all sub-bands allocated to the user terminal.

Based on the third possible implementation manner of the first aspect, in a fifth possible implementation manner of the first aspect, the step of determining the size of the new transport block schedulable for the user terminal includes determining the size of the new transport block schedulable for the user terminal according to the MCS and the quantity of sub-bands or radio bearers allocated to the user terminal, and by searching a correspondence between the MCS, the quantity of sub-bands or radio bearers, and a transport block size.

According to a second aspect, a frequency band resource scheduling apparatus is provided. A sub-band selecting module is configured to select, according to transmission quality of each to-be-selected sub-band from at least one to-be-selected sub-band, a sub-band to be allocated to a user terminal. A resource scheduling processing module is configured to determine whether a transmission quality decreasing amplitude of the user terminal exceeds a preset value after the sub-band selected by the sub-band selecting module is allocated to the user terminal. If so, allocating the selected sub-band to the user terminal is skipped; otherwise, the selected sub-band is allocated to the user terminal.

Based on the second aspect, in a first possible implementation manner of the second aspect, the sub-band selecting module includes a sub-band channel quality acquiring module, which is configured to acquire a channel quality indicator CQI that is of the at least one to-be-selected sub-band and that is reported by the user terminal and a sub-band selecting submodule, which is to select, from the at least one to-be-selected sub-band according to the CQI acquired by the sub-band channel quality acquiring module, a sub-band with optimal channel quality as the sub-band to be allocated to the user terminal.

Based on the second aspect, in a second possible implementation manner of the second aspect, the apparatus includes a transport block size calculating module, which is configured to calculate a size of a new transport block schedulable for the user terminal after the sub-band selected by the sub-band selecting module is allocated to the user terminal. In addition, a determining module is configured to, when it is determined that a difference between the size, obtained by calculation by the transport block size calculating module, of the new transport block schedulable for the user terminal after the sub-band is allocated and a size of an original transport block exceeds a first preset value, or when it is determined that the size, obtained by calculation, of the new transport block schedulable for the user terminal after the sub-band is allocated is less than a second preset value, determine that the transmission quality decreasing amplitude of the user terminal exceeds the preset value; otherwise, determine that the transmission quality decreasing amplitude of the user terminal does not exceed the preset value.

Based on the second possible implementation manner of the second aspect, in a third possible implementation manner of the second aspect, the transport block size calculating module includes a modulation encoding scheme calculating module, configured to calculate an average of CQIs of all sub-bands of the user terminal after the sub-band selected by the sub-band selecting module is allocated to the user terminal; and determine a modulation and coding scheme MCS in a system according to the average of the CQIs of all the sub-bands of the user terminal. A transport block size calculating submodule is configured to determine, based on the MCS determined by the modulation and coding scheme calculating module and a quantity of sub-bands or radio bearers allocated to the user terminal, the size of the new transport block schedulable for the user terminal.

Based on the third possible implementation manner of the second aspect, in a fourth possible implementation manner of the second aspect, in the modulation and coding scheme calculating module, a calculation manner of calculating the average of the CQIs of all the sub-bands of the user terminal after the sub-band selected by the sub-band selecting module is allocated to the user terminal includes average of CQIs of all sub-bands of the user terminal=$(CQI_1+CQI_2+ \ldots +CQI_n)$/quantity of sub-bands, where $CQI_1$ is a CQI value corresponding to the first sub-band allocated to the user terminal, $CQI_2$ is a CQI value corresponding to the second sub-band allocated to the user terminal, $CQI_n$ is a CQI value corresponding to the $n^{th}$ sub-band allocated to the user terminal, and n is a quantity of all sub-bands allocated to the user terminal.

Based on the third possible implementation manner of the second aspect, in a fifth possible implementation manner of the second aspect, a manner of determining the size of the new transport block schedulable for the user terminal by the transport block size calculating submodule includes determining the size of the new transport block schedulable for the user terminal according to the determined MCS and the quantity of sub-bands or radio bearers allocated to the user terminal, and by searching a correspondence between a preset MCS, the quantity of sub-bands or radio bearers, and a transport block size.

It can be learned, from the foregoing technical solutions provided in the present invention, that interference in a wireless communications system can be effectively reduced by using the technical solutions provided in the embodiments of the present invention.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
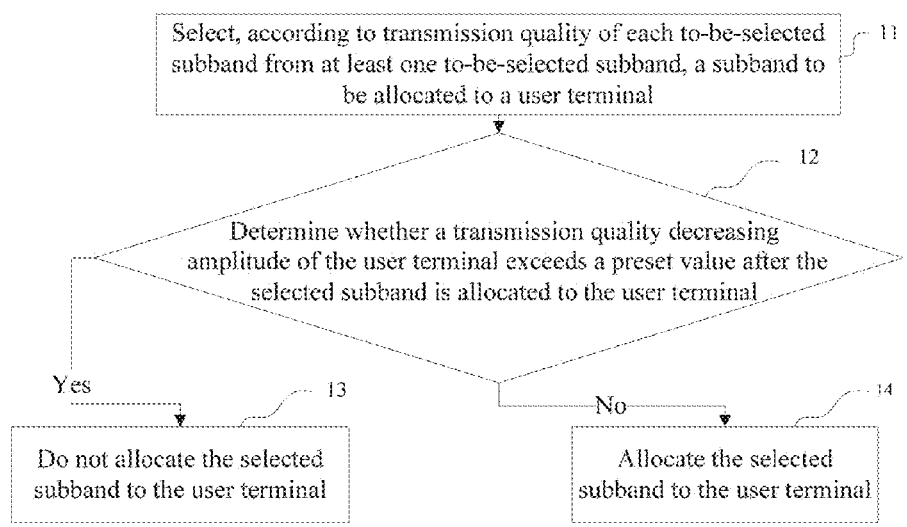
FIG. 1 is a schematic diagram of an implementation process of a method according to an embodiment of the present invention.

An embodiment of the present invention provides a frequency band resource scheduling method, and a specific implementation process of the method is shown in FIG. 1. The method may include the following steps.

Step 11: Select, according to transmission quality of each to-be-selected sub-band from at least one to-be-selected sub-band, a sub-band to be allocated to a user terminal.

Further, a processing step of selecting a sub-band to be allocated to a user may specifically include but is not limited to acquiring a CQI (Channel Quality Indicator) that is of the at least one to-be-selected sub-band and that is reported by the user terminal, and selecting, from the at least one to-be-selected sub-band according to the CQI that is of the at least one to-be-selected sub-band and that is reported by the user terminal, a sub-band with optimal channel quality as the sub-band to be allocated to the user terminal.

Step 12: Determine whether a transmission quality decreasing amplitude of the user terminal exceeds a preset value after the selected sub-band is allocated to the user terminal; and if yes, execute step 13; otherwise, execute step 14.

Specifically, in this step, the determining whether a transmission quality decreasing amplitude of the user terminal exceeds a preset value may be in, but is not limited to, the following manner: acquiring a size of a new transport block schedulable for the user terminal after the selected sub-band is allocated to the user terminal. Generally, a larger transport block schedulable for a terminal represents better transmission quality for the user terminal, and a smaller transport block schedulable for the terminal represents worse transmission quality for the user terminal. Therefore, after the size of the new transport block schedulable for the user terminal is acquired, it may be determined, according to the size of the new transport block schedulable for the user terminal, whether the transmission quality decreasing amplitude of the user terminal exceeds the preset value after the selected sub-band is allocated to the user terminal.

The preset value may be a value greater than or equal to zero. For example, when the preset value is zero, step 13 is executed as long as a transmission quality decreasing value is greater than zero.

The determining whether a transmission quality decreasing amplitude of the user terminal exceeds a preset value after the selected sub-band is allocated to the user terminal may specifically include acquiring a size of a new transport block schedulable for the user terminal after the selected sub-band is allocated to the user terminal; and, if the difference between the size of the new transport block schedulable for the user terminal and a size of an original transport block exceeds a first preset value, or the size of the new transport block schedulable for the user terminal is less than a second preset value, determining that the transmission quality decreasing amplitude of the user terminal exceeds the preset value; otherwise, determining that the transmission quality decreasing amplitude of the user terminal does not exceed the preset value.

It should be noted that in this step, correspondingly, a first preset value may be a value greater than or equal to zero. For example, when the first preset value is zero, step 13 may be executed as long as the difference between the size, obtained by calculation, of the transport block schedulable for the user terminal after the sub-band is allocated and the size of the original transport block is greater than zero.

Correspondingly, the second preset value may be determined according to a network transmission quality requirement of a system or a network transmission quality status expected to be provided for the user terminal.

Step 13: End a resource allocation process of this time, and do not allocate the selected sub-band to the user terminal.

Performing step 13 may prevent allocating an interfered sub-band to the user terminal.

Step 14: Allocate the selected sub-band to the user terminal.

If in step 12, the transmission quality decreasing amplitude of the user terminal does not exceed the preset value after the selected sub-band is allocated to the user terminal, it is determined that the selected sub-band is not interfered, and the selected sub-band may be allocated to the user terminal.

Specifically, in the foregoing processing process, a processing process, described in step 12, of acquiring a size of a transport block schedulable for the user terminal after the selected sub-band is allocated to the user terminal may specifically include but is not limited to:

(1) Calculate an average of CQIs of all sub-bands of the user terminal after the selected sub-band is allocated to the user terminal; and determine an MCS (Modulation and Coding Scheme) in a system according to the average of the CQIs of all the sub-bands of the user terminal.

Specifically, a manner of calculating the average of the CQIs of all the sub-bands of the user terminal may include but is not limited to: average of CQIs of all sub-bands of the user terminal=$(CQI_1+CQI_2+ \ldots +CQI_n)$/quantity of sub-bands, where $CQI_1$ is a CQI value corresponding to the first sub-band allocated to the user terminal, $CQI_2$ is a CQI value corresponding to the second sub-band allocated to the user terminal, $CQI_n$ is a CQI value corresponding to the $n^{th}$ sub-band allocated to the user terminal, and n is a quantity of all sub-bands allocated to the user terminal.

(2) Determine, based on the MCS and a quantity of sub-bands or radio bearers allocated to the user terminal, a size of a transport block schedulable for the user terminal; further, correspondingly, a manner of determining the size of the transport block schedulable for the user terminal may include but is not limited to: determining the size of the transport block schedulable for the user terminal according to the MCS and the quantity of sub-bands or radio bearers allocated to the user terminal, and by searching a correspondence between the MCS, the quantity of sub-bands or radio bearers, and a transport block size, that is, the correspondence between the MCS, the quantity of sub-bands (or the quantity of radio bearers, that is, the quantity of sub-bands may also be replaced with the quantity of radio bearers), and the transport block size may be generally prestored for searching. In the correspondence, any MCS value and any quantity of sub-bands (or any quantity of radio bearers) are corresponding to only one TBS (Transport Block Size) value.

According to the foregoing embodiment of the present invention, in a wireless communications system, due to narrowband interference to a sub-band, a problem of low modulation and coding scheme and low spectral efficiency for scheduling when a full frequency band is occupied in resource allocation for a user is resolved. That is, by using the foregoing technical solution provided in this embodiment of the present invention, interference in the wireless communications system can be effectively reduced.

For ease of understanding, the following further describes a specific implementation manner of the embodiment of the present invention with reference to an accompanying drawing.

An embodiment of the present invention provides a spectral efficiency-based scheduling solution, and specifically, a sub-band may be selected according to a CQI that is of a sub-band and that is reported by a user terminal.

Figure 2:
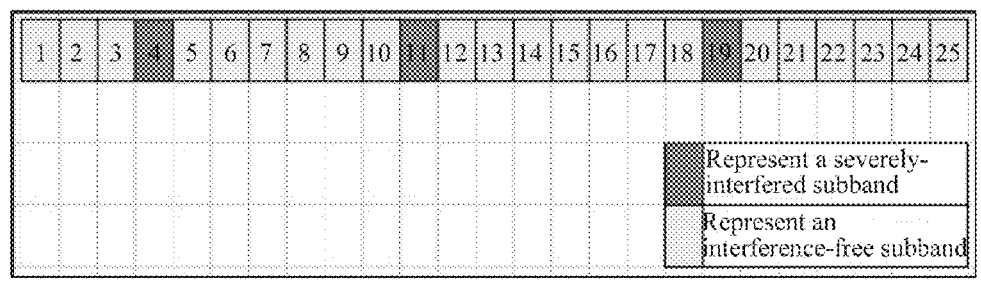
FIG. 2 is a schematic diagram of a sub-band status according to an embodiment of the present invention.

As shown in FIG. 2, it is assumed that there are 25 sub-bands in total in a frequency domain in a system, sub-bands 4, 11, and 19 are severely interfered (namely, narrowband interference) and other sub-bands are not interfered.

Based on a situation shown in FIG. 2, if the spectral efficiency-based scheduling solution provided in this embodiment of the present invention is used, it may be considered that a sub-band is sequentially selected according to channel quality from best to worst. For example, a sub-band with optimal channel quality is preferentially selected, and then a sub-band with better channel quality is selected. Each time a sub-band is selected, transmission quality (for example, a transmission rate) is pre-estimated. When a selected sub-band causes transmission quality (for example, the transmission rate) to decrease, a process of selecting and allocating the sub-band is stopped. In this way, an interfered sub-band may be blocked selectively, and only a sub-band that is not interfered is allocated to the user terminal. In this case, even though a frequency band size (a quantity of sub-bands allocated to the user terminal) allocated to the user terminal is relatively small, channel quality of the allocated sub-band is relatively good, thereby increasing a modulation and coding scheme and improving overall spectral efficiency.

The following uses an LTE system as an example to describe, with reference to accompanying drawings, a specific implementation procedure of the spectral efficiency-based scheduling solution provided in the embodiment of the present invention. The implementation procedure may specifically include the following steps.

Step 31: A base station divides a bandwidth in a frequency domain into multiple sub-bands.

Specifically, sub-band division may be performed according to a bandwidth size of a system. For example, in an LTE system of 20 MHz, there are 100 RBs (Resource Block) in the frequency domain, four adjacent RBs may be used as a sub-band, and there are 25 sub-bands in the LTE system. To execute a spectral efficiency-based scheduling solution (if a switch of the spectral efficiency-based scheduling solution is on), the base station may notify, by using a configuration message or a broadcast message, all user terminals of the cell of a corresponding quantity of divided sub-bands, so that the user terminals report CQIs of all sub-bands.

Step 32: The base station receives CQIs that are of all sub-bands and that are reported by a user terminal.

Figures 3, 4:
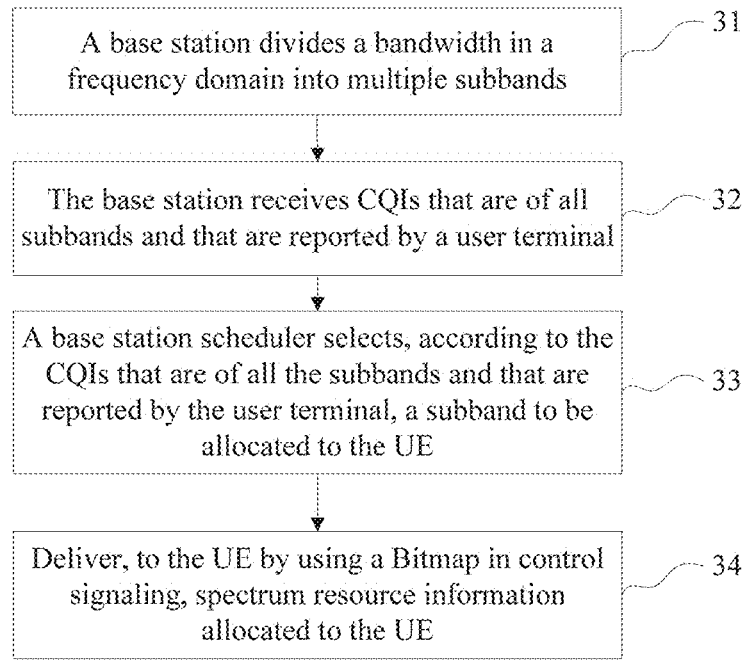
FIG. 3 is a processing flowchart of a specific implementation manner according to an embodiment of the present invention.
FIG. 4 is a reference chart of a quantized CQI according to an embodiment of the present invention.

Further, the user terminal may obtain, through measurement performed by the user terminal, a signal-to-noise ratio (SINR) of each sub-band, and quantize the signal-to-noise ratio obtained through measurement as a CQI of 4 bits. For example, quantization may be performed with reference to a chart shown in FIG. 4. In FIG. 4, each signal-to-noise ratio SINR value is corresponding to one CQI index; a corresponding CQI index is determined according to FIG. 4, so that one CQI value of 4 bits corresponding to the CQI index may be determined.

The user terminal may periodically report quantized CQIs of sub-bands to the base station, or may report quantized CQIs of sub-bands to the base station in real time, or may report quantized CQIs of sub-bands to the base station at a specified time point.

Step 33: A base station scheduler selects, according to the CQIs that are of all the sub-bands and that are reported by the user terminal, a sub-band to be allocated to the UE (namely, the user terminal).

Figure 5:
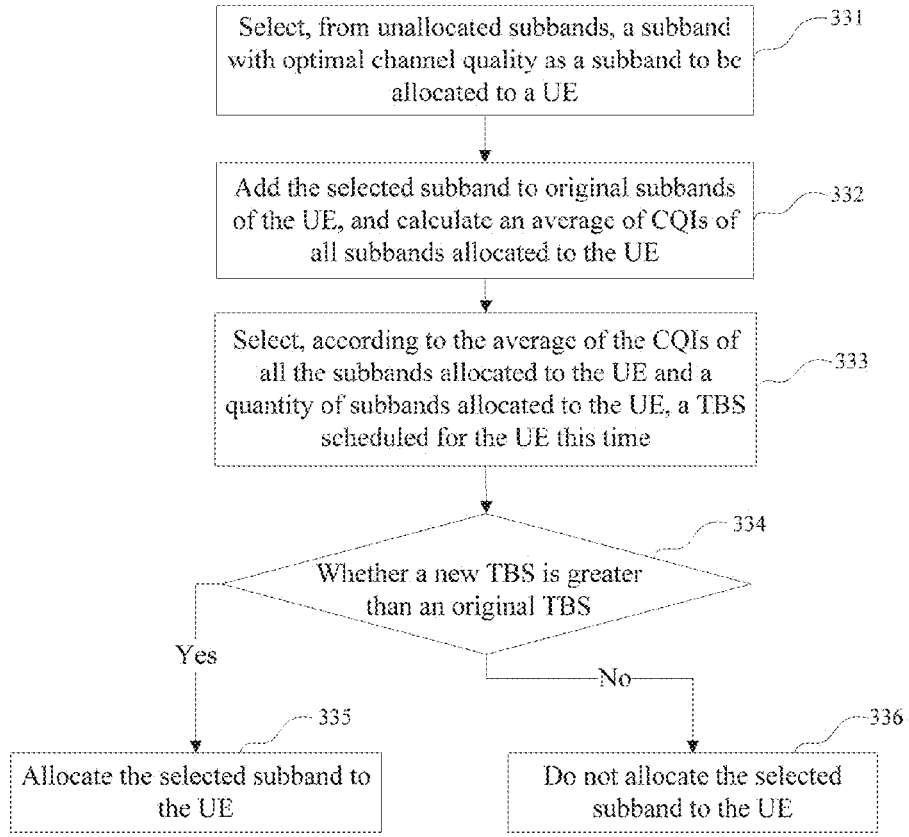
FIG. 5 is a flowchart of sub-band selection in a specific implementation manner according to an embodiment of the present invention.

In this step, a specific manner of selecting a sub-band is shown in FIG. 5, which may include the following steps.

Step 331: Select, from unallocated sub-bands, a sub-band with optimal channel quality as the sub-band to be allocated to the UE.

A selected sub-band (or an RB) is identified by using a bitmap (a bitmap, that is, whether the sub-band or the RB is occupied is represented by using a binary bit), so as to prevent duplicated allocation.

A larger CQI represents better channel quality, and therefore, the base station may select, from the unallocated sub-bands, one sub-band with a highest CQI as the sub-band to be allocated to the UE.

Step 332: Add the selected sub-band to original sub-bands (namely, sub-bands that have been allocated to the UE) of the UE, and calculate an average of CQIs of all sub-bands allocated to the UE.

Specifically, average of CQIs of all sub-bands allocated to the UE=$(CQI_1+CQI_2+ \ldots +CQI_n)$/quantity of sub-bands.

Step 333: Select, according to the average of the CQIs of all the sub-bands allocated to the UE and a quantity of sub-bands (or a quantity of RBs) allocated to the UE, a TBS scheduled for the UE this time, where the TBS is a quantity of bits that are carried by a resource allocated to a terminal.

In this step, a manner of selecting a TBS scheduled for the UE this time may include:

First, mapping the average of the CQIs of all the sub-bands allocated to the UE to a modulation and coding scheme (MCS, of which a specific value ranges from 0 to 26), where a mapping manner may include: MCS=2*CQI−4; then, in an LTE system, determining, according to the MCS and a quantity of allocated sub-bands (or a quantity of RBs, that is, the quantity of sub-bands may also be replaced with RBs), the TBS (the MCS and the quantity of sub-bands or RBs are generally corresponding to a unique TBS, and therefore, the TBS scheduled for the UE this time may be determined according to the MCS and the quantity of sub-bands or RBs) scheduled for the UE this time.

Step 334: Compare a new TBS schedulable for the UE after the selected sub-band is allocated to the UE and TBS (original TBS for short) schedulable for the UE before the selected sub-band is allocated to the UE. If the new TBS is greater than the original TBS, it indicates that the transmission rate is increased, and step 335 is executed; otherwise, it indicates that the transmission rate is decreased, and step 336 is executed.

Step 335: Allocate the selected sub-band (namely, the sub-band to be allocated to the UE) to the UE.

Step 336: End the current sub-band-based resource scheduling allocation process, and do not allocate the selected sub-band to the UE, so as to avoid decreasing a transmission rate.

Further, after step 336 is executed, if the UE still needs more spectrum resources and an available unallocated sub-band exists, step 331 may be executed again, until there is no available unallocated sub-band or the UE does not need more spectrum resources; then, a resource allocation operation is stopped.

Step 34: Deliver, to the UE by using a Bitmap in control signaling, spectrum resource (a quantity of RBs and a location) information allocated to the UE.

It can be learned from the description of the embodiment that, in the LTE system, a sub-band is selected in descending order of the channel quality of the sub-bands according to channel quality that is of the sub-bands and that is reported by the UE, and pre-estimation is performed on a UE rate each time a sub-band to be allocated to the UE is selected, so as to find a rising-to-falling inflection point of a transmission rate, thereby effectively performing block processing on some interfered sub-bands within a system bandwidth and improving spectral efficiency.

Apparently, the technical solution provided in this embodiment of the present invention may be used in any wireless communications system, for example, may not only be applied to an LTE system but also be applied to a wireless communications system, such as Wimax (Worldwide Interoperability for Microwave Access).

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (ROM), or a random access memory (RAM), or the like.

Figure 6:
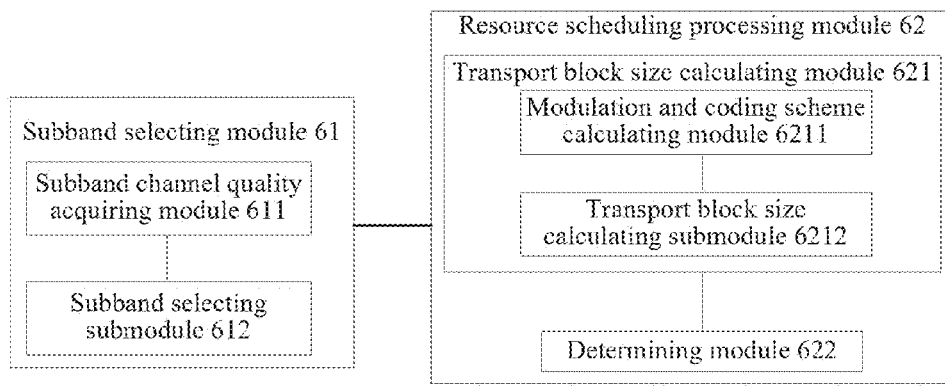
FIG. 6 is a schematic structural diagram of an apparatus according to an embodiment of the present invention.

An embodiment of the present invention further provides a frequency band resource scheduling apparatus, as shown in FIG. 6. A sub-band selecting module 61 is configured to, when a sub-band resource needs to be allocated to a user terminal, select, according to transmission quality of each to-be-selected sub-band from at least one to-be-selected sub-band, a sub-band to be allocated to a user terminal. A resource scheduling processing module 62 is configured to determine whether a transmission quality decreasing amplitude of the user terminal exceeds a preset value after the sub-band selected by the sub-band selecting module 61 is allocated to the user terminal. If so, allocating the selected sub-band to the user terminal is skipped; otherwise, the selected sub-band is allocated to the user terminal.

Further, the sub-band selecting module 61 may specifically include but is not limited to a sub-band channel quality acquiring module 611, which is configured to acquire a channel quality indicator CQI that is of the at least one to-be-selected sub-band and that is reported by the user terminal; and a sub-band selecting submodule 612, which is configured to select, from the at least one to-be-selected sub-band according to the CQI acquired by the sub-band channel quality acquiring module 612, a sub-band with optimal channel quality as the sub-band to be allocated to the user terminal.

Specifically, a processing part that the resource scheduling processing module 62 determines whether the transmission quality decreasing amplitude of the user terminal exceeds the preset value after the selected sub-band is allocated to the user terminal may specifically be implemented by using a transport block size calculating module 621 and a determining module 622 in the following, where a specific implementation manner of the two modules may include that the transport block size calculating module 621 is configured to calculate a size of a new transport block schedulable for the user terminal after the sub-band selected by the sub-band selecting module 61 is allocated to the user terminal. The determining module 622 is configured to, when it is determined that a difference between the size, obtained by calculation by the transport block size calculating module 621, of the new transport block schedulable for the user terminal after the sub-band is allocated and a size of an original transport block exceeds a first preset value, or when it is determined that the size, obtained by calculation, of the transport block schedulable for the user terminal after the sub-band is allocated is less than a second preset value, determine that the transmission quality decreasing amplitude of the user terminal exceeds the preset value; otherwise, determine that the transmission quality decreasing amplitude of the user terminal does not exceed the preset value.

Optionally, an implementation manner of the transport block size calculating module 621 may specifically include that a modulation and coding scheme calculating module 6211 is configured to calculate an average of CQIs of all sub-bands of the user terminal after the sub-band selected by the sub-band selecting module 61 is allocated to the user terminal; and determine a modulation and coding scheme MCS in a system according to the average of the CQIs of all the sub-bands of the user terminal, where in the modulation and coding scheme calculating module 6211, a manner of calculating the average of the CQIs of all the sub-bands of the user terminal may include but is not limited to: average of CQIs of all sub-bands of the user terminal=$CQI_1+CQI_2+ \ldots +CQI_n$/quantity of sub-bands, where $CQI_1$ is a CQI value corresponding to the first sub-band allocated to the user terminal, $CQI_2$ is a CQI value corresponding to the second sub-band allocated to the user terminal, $CQI_n$ is a CQI value corresponding to the $n^{th}$ sub-band allocated to the user terminal, and n is a quantity of all sub-bands allocated to the user terminal.

A transport block size calculating submodule 6212 is configured to determine, based on the MCS determined by the modulation and coding scheme calculating module 6211 and a quantity of sub-bands or radio bearers allocated to the user terminal, the size of the transport block schedulable for the user terminal, where a manner of determining, by the transport block size calculating submodule 6212, the size of the transport block schedulable for the user terminal may specifically include but is not limited to: determining the size of the new transport block schedulable for the user terminal according to the determined MCS and the quantity of sub-bands or radio bearers allocated to the user terminal, and by searching a correspondence between a preset MCS, the quantity of sub-bands or radio bearers, and a transport block size.

By using the apparatus, an inflection point of transmission rate may be found in a sub-band-based resource allocation process, thereby effectively performing block processing on some interfered sub-bands within a system bandwidth and improving spectral efficiency.

Figure 7:
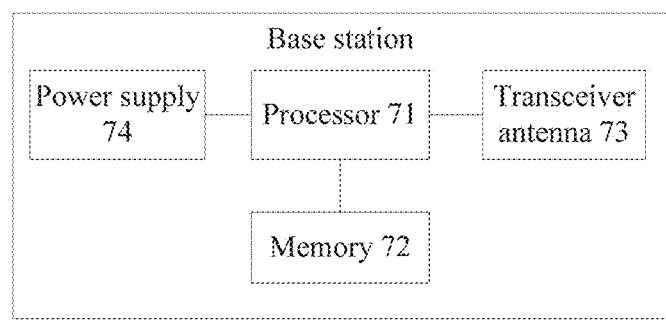
FIG. 7 is a schematic structural diagram of a base station according to an embodiment of the present invention.

Specifically, the frequency band resource scheduling apparatus may be disposed in a base station, and a structure of a corresponding base station may be shown in FIG. 7, where the base station includes at least a processor 71 and a memory 72.

The memory 72 is configured to store code that is used to implement any one of the foregoing method embodiments; the processor 71 is configured to execute the code stored in the memory 72.

In addition to the memory 72 and the processor 71, the base station may further include components such as a transceiver antenna 73 and a power supply 74.

The power supply 74 is responsible for supplying power for the components such as the processor 71 and the memory 72, and the base station may receive information (for example, acquiring a CQI that is of the at least one to-be-selected sub-band and that is reported by the user terminal) from the user terminal by using the transceiver antenna 73, and send the information to the user terminal by using the transceiver antenna 73. FIG. 7 is only an example of the structure of the base station, which does not impose a limitation on the present invention.

It should be noted that a specific implementation manner of a function implemented by the processing units included in the foregoing apparatus is described in detail in the foregoing embodiments, and therefore details are not described herein again.

It may be clearly understood by a person skilled in the art that, for ease and brevity of description, division of the foregoing functional modules is merely used as an example for illustration. In an actual application, the foregoing functions may be implemented by different functional modules according to a requirement, that is, an internal structure of an apparatus is divided into different functional modules to implement all or a part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the module division is merely logical function division and may be other division in actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

In addition, functional modules in the embodiments of the present invention may be integrated into one processing unit, or each of the modules may exist alone physically, or two or more modules are integrated into one unit. The integrated unit may be implemented in a form of hardware, or may be implemented in a form of a software functional unit.

The foregoing descriptions are merely exemplary implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims

What is claimed is:

1. A frequency band resource scheduling method, comprising:
    selecting a sub-band to be allocated to a user terminal according to transmission quality of each to-be-selected sub-band from at least one to-be-selected sub-band;
    determining whether a transmission quality decreasing amplitude of the user terminal would exceed a preset value if the selected sub-band is allocated to the user terminal; and
    allocating the selected sub-band to the user terminal when it is determined that the transmission quality decreasing amplitude of the user terminal would not exceed the preset value, and skipping allocating the selected sub-band to the user terminal when it is determined that the transmission quality decreasing amplitude of the user terminal would exceed the preset value;
    wherein determining whether the transmission quality decreasing amplitude of the user terminal would exceed the preset value if the selected sub-band is allocated to the user terminal comprises:
        acquiring a size of a new transport block schedulable for the user terminal after the selected sub-band is allocated to the user terminal;
        when a difference between the size of the new transport block schedulable for the user terminal and a size of an original transport block exceeds a first preset value, or the size of the new transport block schedulable for the user terminal is less than a second preset value, determining that the transmission quality decreasing amplitude of the user terminal would exceed the preset value; and
        determining that the transmission quality decreasing amplitude of the user terminal would not exceed the preset value when a difference between the size of the new transport block and the size of the original transport block does not exceed the first preset value or the size of the new transport block is not less than the second preset value.

2. The method according to claim 1, wherein the step of selecting a sub-band to be allocated comprises acquiring a channel quality indicator (CQI) that is of the at least one to-be-selected sub-band and that is reported by the user terminal, and selecting, from the at least one to-be-selected sub-band according to the CQI, a sub-band with optimal channel quality as the sub-band to be allocated to the user terminal.

3. The method according to claim 1, wherein the step of acquiring a size of a new transport block comprises:
    calculating an average of CQIs of all sub-bands of the user terminal after the selected sub-band is allocated to the user terminal; and determining a modulation and coding scheme (MCS) in a system according to the average of the CQIs of all the sub-bands of the user terminal; and
    determining, based on the MCS and a quantity of sub-bands or radio bearers allocated to the user terminal, the size of the new transport block.

4. The method according to claim 3, wherein the step of calculating an average of CQIs comprises the average of the $CQIs=(CQI_1+CQI_2+ \ldots +CQI_n)$/the quantity of the sub-bands, wherein $CQI_1$ is a CQI value corresponding to a first sub-band allocated to the user terminal, $CQI_2$ is a CQI value corresponding to a second sub-band allocated to the user terminal, $CQI_n$ is a CQI value corresponding to a $n^{th}$ sub-band allocated to the user terminal, and n is a quantity of all sub-bands allocated to the user terminal.

5. The method according to claim 3, wherein the step of determining the size of the new transport block comprises:
    determining the size of the new transport block schedulable according to the MCS and the quantity of the sub-bands or the radio bearers allocated to the user terminal; and
    searching a correspondence between the MCS, the quantity of the sub-bands or the radio bearers, and a transport block size.

6. A frequency band resource scheduling apparatus, comprising:
    a processor and a non-transitory computer readable medium connected to the processor and having stored thereon instructions that, when executed, cause the processor to:
        select, according to transmission quality of each to-be-selected sub-band from at least one to-be-selected sub-band, a sub-band to be allocated to a user terminal; and
        determine whether a transmission quality decreasing amplitude of the user terminal would exceed a preset value if the selected sub-band is allocated to the user terminal;
        when it is determined that the transmission quality decreasing amplitude of the user terminal would exceed the preset value, skip allocating the selected sub-band to the user terminal; and
        when it is determined that the transmission quality decreasing amplitude of the user terminal would not exceed the preset value, allocate the selected sub-band to the user terminal;

wherein determining whether the transmission quality decreasing amplitude of the user terminal would exceed the preset value if the selected sub-band is allocated to the user terminal comprises:
calculating a size of a new transport block schedulable for the user terminal after the selected sub-band selected is allocated to the user terminal; and
when it is determined that a difference between the size of the new transport block and a size of an original transport block exceeds a first preset value, or when it is determined that the size of the new transport is less than a second preset value, determine that the transmission quality decreasing amplitude of the user terminal exceeds the preset value, otherwise, determine that the transmission quality decreasing amplitude of the user terminal does not exceed the preset value.

7. The apparatus according to claim 6, wherein the non-transitory computer readable medium further stores instructions that, when executed, cause the processor to:
acquire a channel quality indicator (CQI) that is of the at least one to-be-selected sub-band and that is reported by the user terminal; and
select, from the at least one to-be-selected sub-band according to the CQI, a sub-band with optimal channel quality as the sub-band to be allocated to the user terminal.

8. The apparatus according to claim 6, wherein the non-transitory computer readable medium further stores instructions that, when executed, cause the processor to:

calculate an average of CQIs of all sub-bands of the user terminal after the selected sub-band is allocated to the user terminal, and determine a modulation and coding scheme (MCS) in a system according to the average of the CQIs of all the sub-bands of the user terminal; and
determine, based on the MCS and a quantity of sub-bands or radio bearers allocated to the user terminal, the size of the new transport block schedulable for the user terminal.

9. The apparatus according to claim 8, wherein calculating the average of the CQIs of all the sub-bands of the user terminal after the selected sub-band is allocated to the user terminal comprises the average of the CQIs of all sub-bands of the user terminal=$(CQI_1+CQI_2+\ldots+CQI_n)$/the quantity of the sub-bands, wherein $CQI_1$ is a CQI value corresponding to a first sub-band allocated to the user terminal, $CQI_2$ is a CQI value corresponding to a second sub-band allocated to the user terminal, $CQI_n$ a CQI value corresponding to a $n^{th}$ sub-band allocated to the user terminal, and n is a quantity of all sub-bands allocated to the user terminal.

10. The apparatus according to claim 8, wherein determining the size of the new transport block comprises determining the size of the new transport block according to the determined MCS and the quantity of the sub-bands or the radio bearers allocated to the user terminal, and by searching a correspondence between a preset MCS, the quantity of the sub-bands or the radio bearers, and a transport block size.

* * * * *